United States Patent [19]
Rogers

[11] 3,739,860
[45] June 19, 1973

[54] RAKING IMPLEMENT
[75] Inventor: Chester D. Rogers, Olathe, Kans.
[73] Assignee: Jacobsen Manufacturing Company, Racine, Wis.
[22] Filed: May 10, 1971
[21] Appl. No.: 141,500

[52] U.S. Cl............... 172/612, 172/620, 56/400.21
[51] Int. Cl............................................ A01b 35/00
[58] Field of Search ................. 172/612, 619, 620, 172/682, 705, 707, 711, 378, 379, 380, 766; 56/400.21; 171/66, 124

[56] References Cited
UNITED STATES PATENTS
| | | | |
|---|---|---|---|
| 3,613,802 | 10/1971 | Carlson et al...................... | 172/620 |
| 820,449 | 5/1906 | Verperman...................... | 56/400.21 |
| 3,478,827 | 11/1969 | Madson ............................. | 172/379 |
| 494,614 | 4/1893 | Wyman........................... | 172/612 X |

FOREIGN PATENTS OR APPLICATIONS
| | | | |
|---|---|---|---|
| 944,173 | 12/1963 | Great Britain..................... | 172/612 |

Primary Examiner—Robert E. Pulfrey
Assistant Examiner—Stephen C. Pellegrino
Attorney—Schmidt, Johnson, Hovey & Williams

[57] ABSTRACT

A multi-purpose raking implement, especially adapted for maintenance of golf course sand traps, automatically conforms to the topography of the terrain which is traverses by the use of a long, flexible strip to which the raking elements are attached. Such elements act as combs and slicers to break up, decrust, loosen, smooth and aerate the sand or soil, to gather debris and to destroy weeds that have begun to vegetate and grow.

12 Claims, 7 Drawing Figures 3,739,860

INVENTOR.
Chester D. Rogers

BY

Schmidt, Johnson, Hovey & Williams
ATTORNEYS.

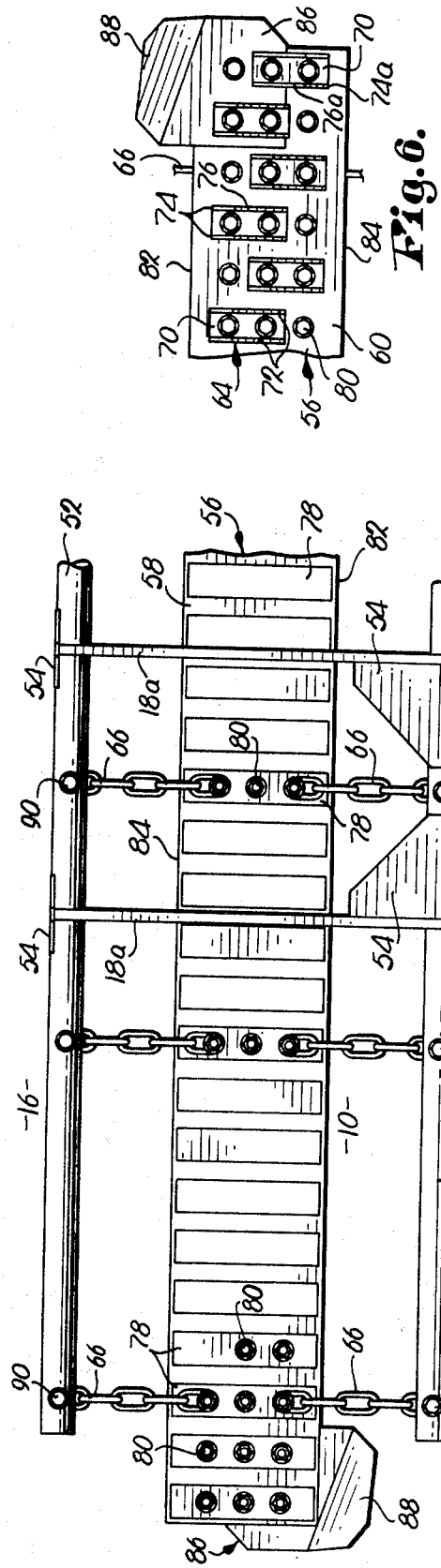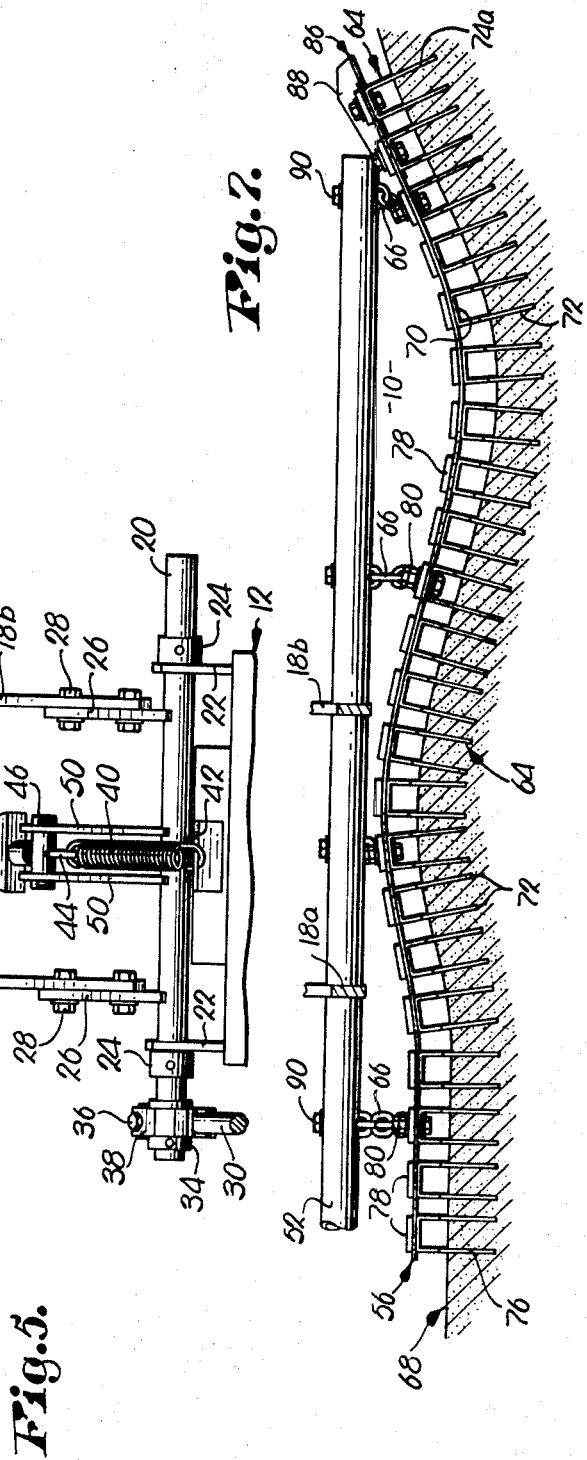

RAKING IMPLEMENT

An important object of my present invention is to provide a raking implement which readily accommodates slopes or inclinations, as well as various curves, shapes, configurations and contours of the terrain being raked.

Another important object of the instant invention is the provision of an implement of husbandry capable of improved stirring, spreading and smoothing of sand or dirt, while wind-rowing debris, regardless of the shape of the periphery of the area being raked or its topographical contours.

Still another important object of the present invention is to provide a tool for grooming golf course sand traps that has extended uses in a wide range of applications such as beaches, lawns and gardens, patio areas or wherever it is desirable or necessary to condition the ground material by a slicing, combing, smoothing or cultivating action.

In the drawings:

FIG. 5 is a fragmentary top plan view;

FIG. 6 is a fragmentary bottom view showing that end of the flexible strip opposite to the end illustrated in FIG. 5; and FIG. 7 is a fragmentary, vertical, cross-sectional view showing the raking elements in rear elevation when in use on irregular topography.

Figure 1:
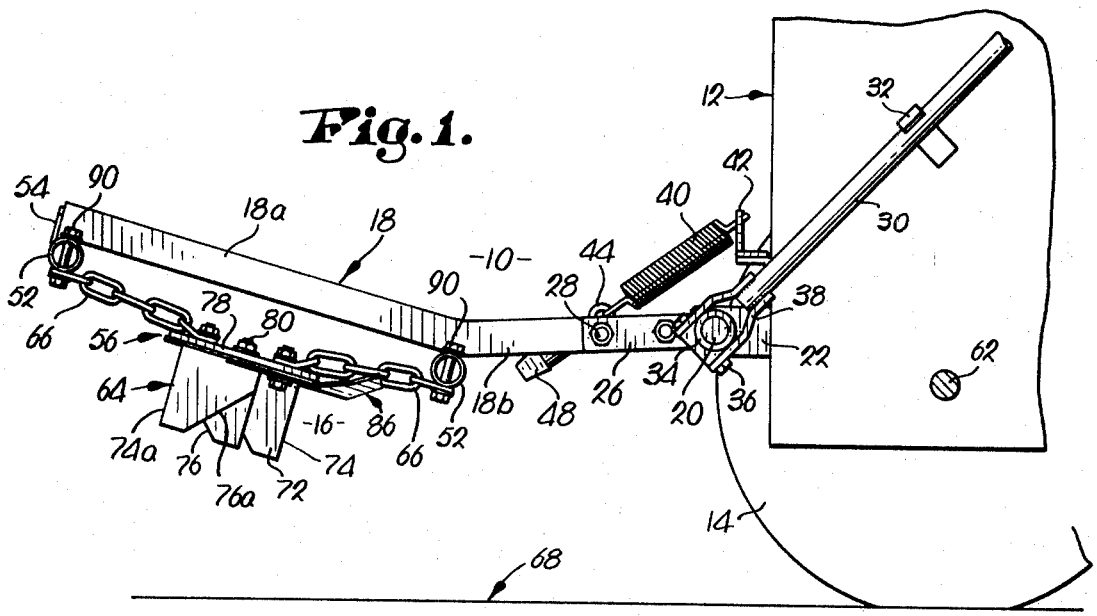
FIG. 1 is a side elevational view of a raking implement made in accordance with my present invention showing the same in its raised position.
Figure 2:
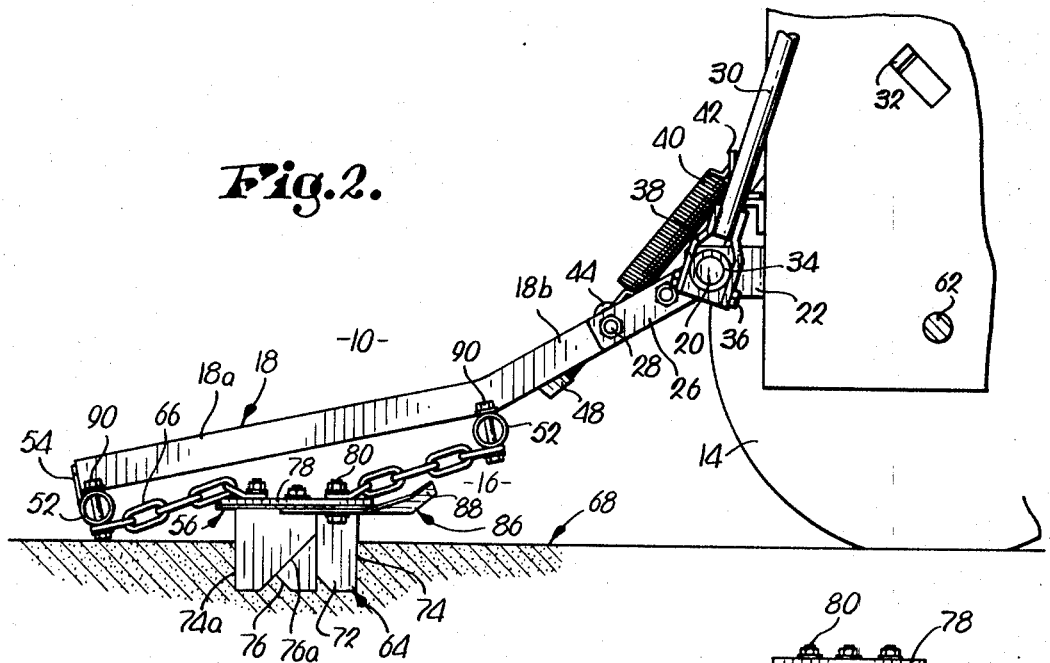
FIG. 2 is a view similar to FIG. 1 showing the raking implement lowered.
Figure 3:
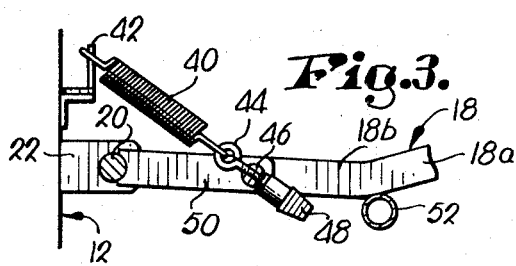
FIG. 3 is a fragmentary, detailed view, partially in section, at about the vertical center line of the implement looking in a direction opposite to FIGS. 1 and 2 and showing the spring flotation.
Figure 4:
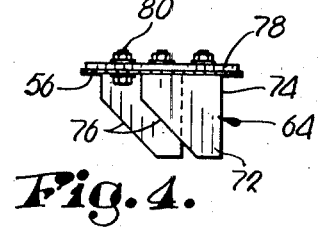
FIG. 4 is a fragmentary detailed cross-sectional view through the flexible strip showing the relative locations of the front and rear rows of raking elements.

Raking implement 10 is adapted for mounting on a vehicle 12, the latter of which is shown only fragmentarily in FIGS. 1-3 of the drawings. In a relatively small version of the implement 10, it may be carried by a vehicle 12 in the nature of a lawn and garden tractor having rear wheels, one of which is shown in FIGS. 1 and 2 and designated by the numeral 14. For purposes of illustration the implement 10 is shown extended rearwardly from the vehicle 12 so that the raking elements hereafter described will operate to cover the tracks made by the wheels of the vehicle 12, but it is to be understood that the concepts of my invention do not depend upon any particular location of the implement 10 with respect to the vehicle 12.

With the above in mind, implement 10 includes a support broadly designated by the numeral 16 having a pair of horizontally spaced arms 18 which extend rearwardly from the implement 12, and more particularly, from a normally horizontal shaft 20 disposed transversely of the normal path of travel of the implement 10.

Shaft 20 is rotatably carried by a pair of ears 22 which extend rearwardly from vehicle 12, the shaft 20 in turn being provided with set collars 24 bearing against the ears 22 for holding the shaft 20 against axial movement. The arms 18 are releasably attached to radial extensions 26 rigid to the shaft 20 by use of bolts 28.

Oscillation of the shaft 20 about its longitudinal axis is effected by manual manipulation of a lever 30, readily accessible to an operator seated on the vehicle 12, the latter of which is provided with a hook 32 adapted to receive the lever 30 as shown in FIG. 1 to releasably hold the implement 10 in a raised condition.

Lever 30 is connected with the shaft 20 by a set collar 34 carrying a tangential pivot 36 for a yoke 38 that is in turn rigid with the lever 30.

A further connection with the vehicle 12 is made through use of a spring 40 having one end thereof connected with a bracket 42 on the vehicle 12. The opposite end of the spring 40 is connected with an eyebolt 44 which passes through a stub shaft 46 and which is provided with an easily manipulated T-shaped nut 48. Stub shaft 46 is carried by a second pair of extensions 50 rigid to the shaft 20 and projecting rearwardly from the latter intermediate the extensions 26.

Support 16 includes additionally a pair of elongated members 52 spaced rearwardly from and parallel with the shaft 20, the members 52 being in turn spaced apart in a fore-and-aft direction. Members 52 are fixed rigidly to the arms 18 therebeneath, such connection being reinforced by a plurality of gussets 54. The arms 18 have rear and front sections 18a and 18b respectively that are angularly offset relatively, the members 52 being carried by the rear sections 18a.

An elongated, relatively thin, continuous strip 56 of flexible material, such as spring steel, having normally horizontal top and bottom surfaces 58 and 60 respectively, is disposed with its longitudinal axis transverse to the path of travel of the implement 10, and therefore, in parallelism with the members 52, the shaft 20, and the rear axle 62 of the vehicle 12.

A plurality of spaced raking elements 64 depend from the bottom surface 60 of the strip 56, and suspension means in the nature of a plurality of short chains 66, cables or the like, attach the strip 56 to the members 52 such that the strip 56 readily conforms to changes in the topography of the terrain 68 traversed by the strip 56.

Each of the elements 64 is U-shaped, presenting a bight 70 bearing against the surface 60 and a pair of blades 72 depending from the bight 70 for effecting a slicing action as the implement 10 is advanced. Except for the two outermost elements 64, each of the blades 72 has an upright leading edge 74 and a trailing edge which includes an inclined portion 76. The end elements 64, on the other hand, are reversed so that their trailing edges 74a are normally vertical and their leading edges are provided with inclined portions 76a.

An elongated bar 78 is placed on the surface 58 of the strip 56 transversely of the latter, directly above each bight 70 respectively, the strip 56 being clamped between the bars 78 and the bights 70 by a plurality of bolts 80.

The strip 56 is provided with parallel front and rear longitudinal edges 82 and 84 respectively and the raking elements 64 are arranged in two rows extending longitudinally of the strip 56, the first of which extends along the front edge 82 and the second of which is spaced rearwardly of the first row, but in spaced overlapping relationship to the intervening alternate elements 64 of the front row thereof. Accordingly, while the bars 78 are each held in place by three releasable bolts 80, but two of such bolts 80 function, in each instance, to attach the bights 70 to the strip 56.

Forwardly and laterally extending shoes or skids 86 are attached to the outer ends of the strip 56, each shoe 86 having an upwardly inclined portion 88 at its forwardmost and outermost corner. Certain of the bolts 80 serve to attach the flexible elements 66 to the strip 56 whereas bolts 90 attach the elements 66 to the two members 52.

OPERATION

By virtue of the connection 34, 36 and 38 of the lever 30 to the shaft 20, lever 30 may be swung downwardly and thence outwardly from the position shown in FIG. 1 so as to permit lowering of the implement 10 from the position shown in FIG. 1 to the operating position illustrated in FIG. 2. Thereupon, while the implement is somewhat floatingly suspended by the spring 40, the extent of which may be determined by adjustment of the nut 48, the elements 64 will penetrate the terrain 68 upon forward movement of the vehicle 12 as illustrated in FIGS. 2 and 7 of the drawings.

It is to be preferred that the adjustment of the tension of the spring 40 be such as to hold the support 16 at a height sufficient merely to preclude unlimited penetration of the elements 64 such as to cause undesirable dragging of the strip 56 across the terrain 68. However, at all times, the strip 56 and its component parts are free to move vertically with respect to the support 16, to a limited extent at least, because of the flexibility of the chains 66 as the front chains 66 tow the strip 56 and the rear chains 66 tend to hold the strip 56 against tilting with the rear edge 84 moving upwardly.

More importantly is the result obtained as depicted in FIG. 7 of the drawings. The flexibility of the strip 56 permits it to conform to the topography of the terrain 68 and in this regard, the nature of golf club sand traps must be understood. As is well known, such artificial hazards in the nature of bunkers or embankments, often near a green, usually consist of a depression containing sand, and they vary substantially in size, peripheral configuration, and top contour.

Therefore, for the most part, maintenance has required hand labor, many courses employing three or more workers at substantial expense for such purpose. Even then, the sand traps are not tended as frequently as the golfers expect or desire, and there is a great need for a less expensive maintenance implement, such as here provided, which will permit the necessary maintenance quickly, and on a daily basis, without undue consumption of time or expense. While attempts have heretofore been made to provide raking implements for such purpose, none have been satisfactory, not only because of inability to conform to the characteristics of each of the many types of sand traps, but because a proper combing, cutting and slicing action is not imparted to the material within the traps.

FIG. 2 of the drawings vividly demonstrates the way in which the leading edges 74 and 76a of all of the blades 72 of the elements 64 easily and smoothly cut and slice through the sand or other material such as to comb and smooth the sand traps, removing top crusts, breaking up clusters, eliminating footprints, and destroying weeds and other growths while, at the same time, maintaining the original, preformed top configuration as shown, for example, in FIG. 7.

In this regard, it is to be noted that the bars 78 serve the dual function of holding the strip 56 against transverse flexure and, at the same time, providing sufficient weight on the strip 56 to hold the slicing elements 64 downwardly into the material being treated.

If additional weight is needed under certain particular circumstances or conditions, it is but necessary to superimpose additional bars 78 and attach them in place by use of the fasteners 80.

The staggered relationship of the elements 64 on the surface 60 of the strip 56 and the arrangement thereof in front and rear rows serves also to maintain the strip 56 substantially horizontal transversely thereof. Any tendency of the leading edges 74 and 76a of the blades 72 along the front row to cause the strip 56 to tilt clockwise viewing FIG. 2 is overcome by the action of the leading edges 74 and 76a of the rear row of spaced apart blades 72.

The aforementioned reversal of the two end elements 64 and the provision of the skids 86 is for the purpose of alleviating turf damage at the periphery of the sand trap. This permits the operator to treat the sand trap throughout its expanse and if, in guiding the vehicle 12, he happens to slightly overlap the turf the skids 86 will tend to cause the outer elements 64 to ride over the turf, and the inclined leading edges 76a of the outer elements 64 will be less likely to dig into the turf than would be true if such outer elements 64 were provided with straight, upright, forwardmost cutting edges, as in the case of the majority of the elements 64.

If the elements 64 encounter any debris, it is but necessary for the operator, through use of the lever 30, to raise the support 16 so as to clear the elements 64 of the debris and to windrow the latter for easy collection and removal. This is particularly advantageous when the implement 10 is used on beaches where cans, bottles, papers and other trash must be removed periodically and again, where it is desirable to rake, smooth and otherwise recondition the beach areas, oftentimes on a daily basis.

It is manifest also that the use of the raking element 10 is not limited to treatment of sand. On the contrary, lawns and gardens may be smoothed, declodded, aerated, cleaned of undesirable growth as well as trash, and otherwise maintained. Moreover, it is to be understood that the implement 10 has no size limitations; therefore, similar advantages can be expected if the implement 10 is adapted for farm use in fields wherein conventional tillage equipment is incapable of performance comparable to that of the implement 10 as hereinabove explained.

Having thus described the invention, what is claimed as new and desired to be secured by Letters Patent is:

1. A raking implement comprising:
 a support;
 an elongated, relatively thin, continuous strip of flexible material having normally horizontal top and bottom surfaces and being disposed with its longitudinal axis transverse to the path of travel of the implement;
 a plurality of spaced raking elements depending from said strip; and
 suspension means loosely attaching said strip to the support whereby the strip readily conforms to changes in the topography of the terrain traversed thereby,
 each of said elements being U-shaped, presenting a bight secured to said bottom surface of the strip and a pair of spaced blades depending from the bight, each blade having an upright leading edge for effecting a slicing action as the implement is advanced, said strip having a front and a rear longitudinal edge, there being a first row of said elements along said front edge and a second row of said elements spaced rearwardly of said first row for holding the strip generally horizontal transversely thereof during raking.

2. A raking implement comprising:
a support;
an elongated, relatively thin, continuous strip of flexible material having normally horizontal top and bottom surfaces and being disposed with its longitudinal axis transverse to the path of travel of the implement;
a plurality of spaced raking elements depending from said strip;
suspension means loosely attaching said strip to the support whereby the strip readily conforms to changes in the topography of the terrain traversed thereby;
a plurality of spaced, rigid bars secured to said top surface of the strip transversely thereof, providing weight to yieldably bias the strip downwardly and stiffening the same to preclude flexure of the strip transversely thereof,
each of said elements being U-shaped, presenting a bight secured to said bottom surface of the strip and a pair of spaced blades depending from the bight, each blade having an upright leading ledge for effecting a slicing action as the implement is advanced, there being an element underlying each bar respectively; and
releasable fastening means common to each bar and its corresponding element clamping the strip between the bars and said bights.

3. A raking implement comprising:
a support;
an elongated, relatively thin, continuous strip of flexible material having normally horizontal top and bottom surfaces and being disposed with its longitudinal axis transverse to the path of travel of the implement;
a plurality of spaced raking elements depending from said strip;
suspension means loosely attaching said strip to the support whereby the strip readily conforms to changes in the topography of the terrain traversed thereby;
a vehicle;
means mounting said support on the vehicle for up-and-down movement relative to the vehicle;
resilient means interconnecting the vehicle and the support for limiting the extent of downward movement of the latter; and
means connected with the support for raising the latter to a position holding said elements elevated above the terrain,
each of said elements being U-shaped, presenting a bight secured to said bottom surface of the strip and a pair of spaced blades depending from the bight,
each blade having an upright leading edge for effecting a slicing action as the implement is advanced, said strip having a front and rear longitudinal edge, there being a first row of said elements along said front edge and a second row of said elements spaced rearwardly of said first row for holding the strip generally horizontal transversely thereof during raking.

4. A raking implement as claimed in claim 3; and a plurality of spaced, rigid bars secured to said top surface of the strip transversely thereof, providing weight to yieldably bias the strip downwardly and stiffening the same to preclude flexure of the strip transversely thereof.

5. A raking implement as claimed in claim 4, there being an element underlying each bar respectively; and releasable fastening means common to each bar and its corresponding element clamping the strip between the bars and said bights.

6. A raking implement as claimed in claim 5, said support including a pair of spaced, elongated members parallel with the strip, said suspension means including a plurality of flexible devices attached to each member respectively and to said strip.

7. A raking implement comprising:
a support including a pair of elongated, laterally spaced apart members extending transversely to the normal path of travel of the implement;
an elongated, relatively thin, continuous strip of flexible material having normally horizontal top and bottom surfaces and being disposed between said members with its longitudinal axis extending parallel to the members;
a plurality of spaced raking elements depending from said strip;
first flexible suspension means attaching said strip to one of said members whereby the strip readily conforms to changes in the topography of the terrain traversed thereby; and
second flexible suspension means attaching said strip to the other of said members whereby the strip is supported in both lateral directions by said support and is held against tilting about its longitudinal axis when the elements dig into the terrain during advancement of the implement.

8. A raking implement as claimed in claim 7; a vehicle; means mounting said support on the vehicle for up-and-down movement relative to the vehicle; and means connected with the support for raising the latter to a position holding said elements elevated above the terrain.

9. A raking implement as claimed in claim 7, each of said elements being U-shaped, presenting a bight secured to said bottom surface of the strip and a pair of spaced blades depending from the bight, each blade having an upright leading edge for effecting a slicing action as the implement is advanced.

10. A raking implement as claimed in claim 7; and a plurality of spaced, rigid bars secured to said top surface of the strip transversely thereof, providing weight to yieldably bias the strip downwardly and stiffening the same to preclude flexure of the strip transversely thereof.

11. A raking element as claimed in claim 8, wherein is provided resilient means interconnecting the vehicle and the support for limiting the extent of downward movement of the latter.

12. A raking element as claimed in claim 9, said strip having a front and a rear longitudinal edge, there being a first row of said elements along said front edge and a second row of said elements spaced rearwardly of said first row for holding the strip generally horizontal transversely thereof during raking.

* * * * *